Nov. 8, 1955      I. M. CARTER      2,723,028
EXTRUSION APPARATUS
Filed March 28, 1951      3 Sheets-Sheet 1
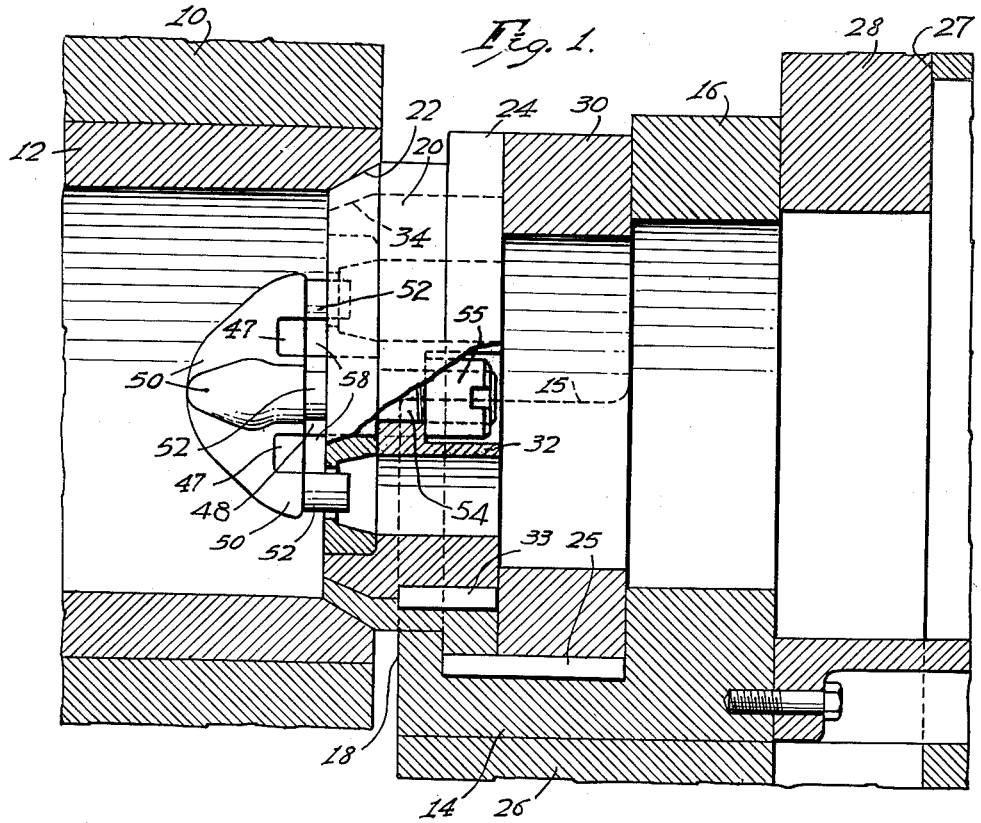
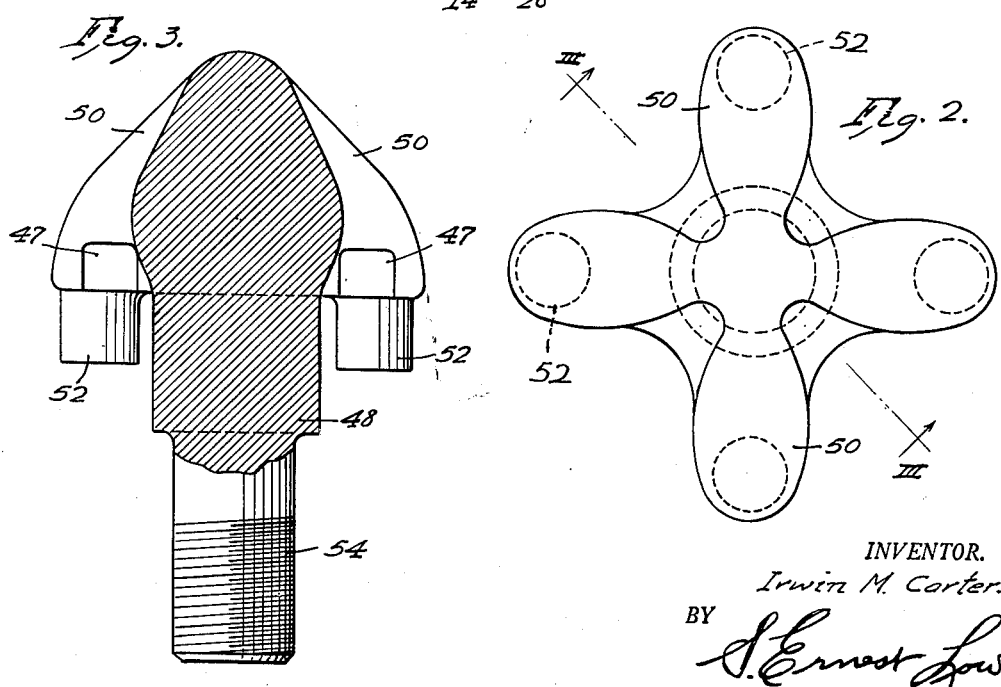
INVENTOR.
Irwin M. Carter.
BY S. Ernest Low.
ATTORNEY:

Nov. 8, 1955
I. M. CARTER
2,723,028
EXTRUSION APPARATUS
Filed March 28, 1951
3 Sheets-Sheet 2
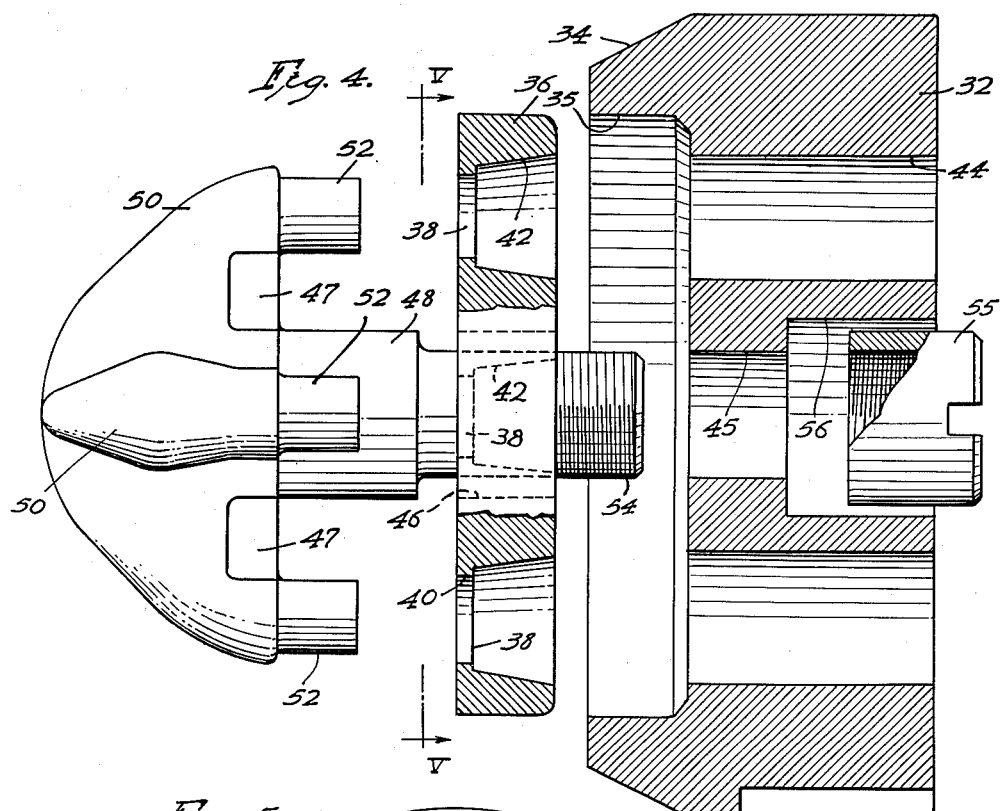
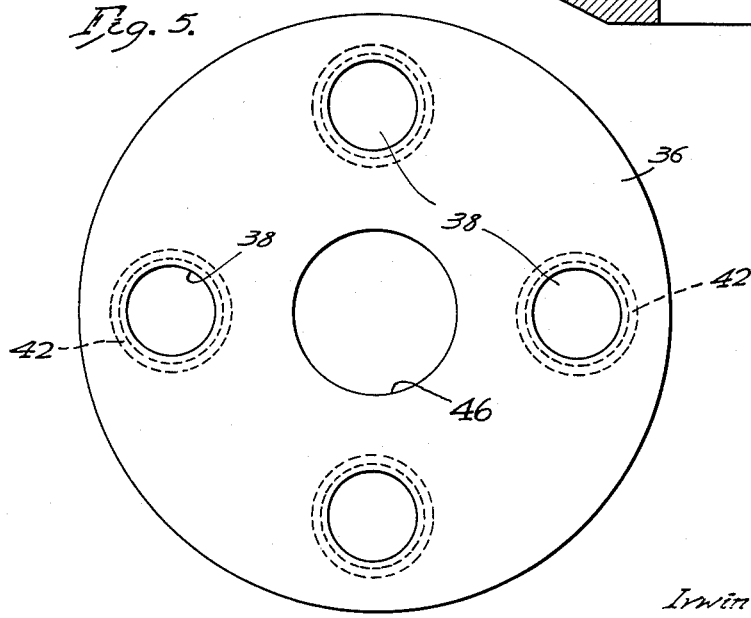
INVENTOR.
Irwin M. Carter.
BY S. Ernest Low.
ATTORNEY:-

Nov. 8, 1955

I. M. CARTER 2,723,028

EXTRUSION APPARATUS

Filed March 28, 1951

INVENTOR.
Irwin M. Carter.
BY
S. Ernest Low.
ATTORNEY:-

United States Patent Office 2,723,028
Patented Nov. 8, 1955

2,723,028

EXTRUSION APPARATUS

Irwin M. Carter, Frankfort, Ind., assignor to Aluminum Company of America, Pittsburgh, Pa., a corporation of Pennsylvania Application March 28, 1951, Serial No. 217,948

4 Claims. (Cl. 207—5)

This invention relates in general to the art of extrusion and is more specifically concerned with extrustion die structures suitable for the simultaneous production of two or more hollow extruded sections.

It is an object of the invention to provide a simplified extrusion die structure that responds under applied extrusion pressure to a minimum amount of deflection and distortion, as measured in terms of wall thickness variations in tubular or hollow extruded product produced through the die structure.

Another object of the invention is to provide an extrusion die structure that generally incorporates a member for supporting a plurality of mandrels, in combination with an equal number of female die apertures, which insures minimum resistance and obstruction to flow of material to be extruded towards and through the die orifices formed between the cooperating mandrels and die apertures.

A further object of the invention is to provide an extrusion die structure that is readily adaptable to presently existing extrusion appparatus without in any way modifying the same.

Another object of the invention is to provide an extrusion die structure which comprises a cantilever-supporting arrangement of relatively short mandrels, rigidly surmounting a cooperating female die plate, in which the mandrel-supporting member is provided with predetermined surface contours to insure a directional flow of the material to be extruded in a manner which serves to balance and maintain the die structure in static equilibrium.

Other objects and advantages will become manifest, to those skilled in the extrusion art, on consideration of the following description and drawings, in which:

Fig. 1 represents a partial sectional elevational view through an extrusion apparatus billet cylinder and tool assembly;

Fig. 2 represents a front elevational view of the mandrel-supporting member of the tool assembly illustrated in Fig. 1;

Fig. 3 represents a sectional elevational view taken on the plane III—III of Fig. 2;

Fig. 4 represents an exploded assembly view, in partial section, of a tool arrangement of the invention;

Fig. 5 represents a front elevation view of the female die plate, as viewed in the direction of the arrows V—V in Fig. 4.

Figure 6:
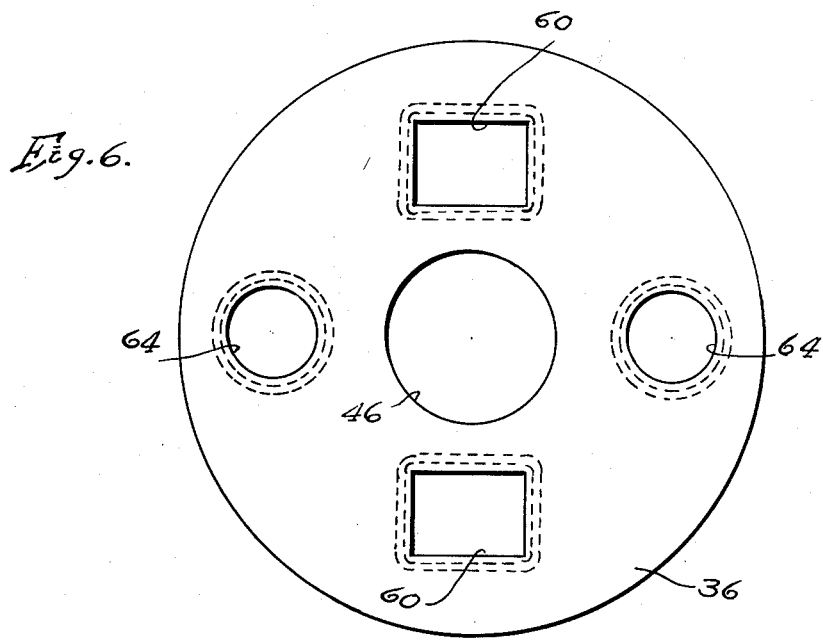
Fig. 6 represents a front elevational view of a modified form of female die plate.

In general, the extrusion die structures of the present invention are concerned with cantilever-supported mandrels disposed around a central pedestal support in a manner to provide minimum obstruction to the flow of the material to be extruded between the mandrels and their cooperating die apertures, as well as distribute and equalize the forces exerted on the mandrels resulting from the pressures encountered and generated during an extrusion operation.

For a more specific description of the invention, reference is made to the drawings appended hereto. In the drawings, 10 represents a container or cylinder for receiving and confining the material, such as a metal billet, to be extruded. The cylinder is normally and preferably provided with a suitable liner 12 shrunk fit into the cylinder 10. A ram, not shown, is employed and is adapted to enter the liner 12 at one end thereof for applying pressure against the material confined therein during extrusion.

A tool assembly is supported at the opposite end of liner 12, from that which admits the ram, which serves to seal the otherwise open end of liner 12 except for the die structure to be later described.

The tool assembly comprises a tool container 14, constructed in the form of an open top, semi-circular channel housing 15, having an integral annular body portion 16 at one end thereof and an inwardly turned flange 18 at its opposite semi-circular channel portion end. A die holder or ring 20, provided with a chamfered surface 22 for sealing engagement on a complementary chamfered surface at the end of liner 12, is equipped with an outwardly extending flange or shoulder 24 for abutting engagement with the tool container flange 18, when the tool ring 20 is lowered into position within the open top, channel portion 15 of the tool container 14. A key 25 received within registering keyways provided in the flange 24 and tool container 14 serves to align the tool ring 20 with the tool container 14.

The tool container is supported within a rigid portion, such as the front platen 26, of the extrusion press with which it is employed. The tool container is also preferably slidably mounted therein for reciprocal or translatory movement into sealing engagement of the tool ring 20 against the liner 12, and outwardly therefrom (to the right as viewed in Fig. 1) to bring the tool assembly beneath the normally employed shearing tools of an extrusion press apparatus. In this connection, a locking plate 28 is provided for reciprocal movement into and out of engagement with a front surface 27 of the platen 26 and the rear end surface of the annular flange 16 of tool container 14. One or more replaceable filler blocks 30, preferably in the form of annuli, are also provided in preselected thickness to take up the space between the rear face of tool ring 20 and front face of tool container flange 16. The aforementioned key 25 is preferably of sufficient length to extend into registering keyways provided in the lower peripheral surface of the block, or blocks, 30 and an extension of the keyway in the inner lower surface of tool container 14, which construction insures alignment of the filler block, or blocks, with its associated assembled elements.

The extrustion die structure of the invention is received within the tool ring 20. It preferably comprises a circular body or housing member 32 (Figs. 1 and 4), which has a sliding fit within the interior bore of the tool ring 20 with which it engages in thrust relationship around complementary peripheral chamfered surfaces 34 on the exterior surface of member 32 and interior surface of tool ring 20. The overall depth or length of the housing member 32 is preferably equal to that of its surrounding tool ring 20. However, housing members 32 of lesser depth than the depth of tool ring 20 have been successfully employed, in which cases filler blocks are made available in various thicknesses for insertion within the interior bore of ring 20 to take up the difference between the overall depths of housing members 32 and tool ring 20. A key 33 is provided and is received within registering keyways formed in the outer surface of housing member 32, and any filler block that may be employed, and inner bore of tool ring 20, respectively, to insure proper alignment of these elements.

The housing member 32 is step-bored at 35 to provide a cavity for a female die plate 36, which is preferably a shrink or press fit therein. The die plate 36 is provided with a plurality of female die apertures 38, preferably equally spaced circumferentially and radially about the geometric center of the die plate 36. The female die apertures are preferably of standard construction in that they are formed with a relatively short exterior configuration controlling bearing or land 40 and are immediately relieved, as at 42, beyond said bearing in the normal direction of material extruded therethrough. Clearance openings or passages 44 are provided in the housing 32 in registry with the discharge relieved ends of the female die apertures 38. Housing 32 and die plate 36 are also provided with aligned central apertures 45 and 46 for receiving central pedestal and threaded shank portions, respectively, of a mandrel-carrying member to be now described.

The mandrel-supporting or carrying device of the invention comprises a central pedestal 48 provided with radially extending, cantilever arms 50, which terminate in forwardly projecting mandrels 52. The mandrel-supporting device is preferably a one-piece steel forging, although it is within the scope of the invention to construct the same from separate elements and assemble such elements in a unitary structure. The central pedestal 48 is reduced in diameter to provide a shoulder and terminates in a reduced threaded shank 54. The pedestal 48 extends into the aperture 46 in the die plate 36, shoulders on the bottom surface of counterbore 35 in housing member 32, and its threaded shank 54 extends through aperture 45 in housing member 32. The rear face of housing member 32 is counterbored at 56 to receive a nut 55, which secures the mandrel-supporting pedestal 48 to housing 32. A cap screw, or other machine screw fastening device, may be employed in place of threaded shank 54 and nut 55 to secure the mandrel-carrying member in rigid assembly with the housing 32.

In assembled relationship (Fig. 1), the mandrels 52 project forwardly into the female apertures 38 and are each rigidly secured and connected to the central pedestal 48 by means of the previously described cantilever arms 50. The mandrels 52, cantilever arms 50 and pedestal 48 preferably constitute a dome-shaped protuberance rigidly mounted in respect to the front face of the female die plate 36. In the specific form selected for illustration, the dome-shaped protuberance is of generally cruciform shape. Each of the radially disposed, cantilever arms 50 preferably exhibits a cross section bounded by blended curvilinear and tangential surfaces which direct the material to be extruded radially outwardly from the central axis of the cylinder 10 towards the inner peripheral wall of the liner 12, as well as forwardly between the intersecting arms 50. In effect, the individual, centrally connected arms 50 provide a piercing nose that directs the material to be extruded radially outwardly towards the confining liner 12 and forwardly through the spaces between the arms 50 to completely fill the space 58 between the underside of the cantilever arms 50 and front face of die plate 36, the depth of space 58 being controlled by the length of the shouldered portion of central pedestal 48.

In the operation of an extrusion cycle, employing the apparatus and tool assembly thus far described, it will be understood that the material under extrusion, and confined within the cylinder 10 and liner 12, will be propelled forwardly (left to right as viewed in Fig. 1) into initial contact with the front convexly curved edges of the arms 50, where its direction of axial forward movement will be, in part, deflected outwardly and forwardly to occupy the space between the inner surface of liner 12 and the free ends of the arms 50, with simultaneous filling of the spaces between the arms 50. Continued pressure and resulting movement of the material to be extruded serves to completely fill the space 58 with material supplied by inward lateral flow from the inner wall of the liner 12, as well as material moving forward between the arms 50. A solid mass of extruded material within the space 58 results through unison and coalescence of the several forwardly advancing streams and lateral inwardly directed flow under extrusion pressure. If desired, an additional supply of the material to be extruded may be provided immediately adjacent the underside of the mandrel cantilever arms 50 by removing a portion of these arms as at 47. Continued extrusion pressure forces the material through the die orifices formed between the mandrels 52 and die apertures 38 to produce a plurality of tubular hollow sections of indeterminate length.

The die structure thus far described has incorporated four die apertures 38 and four mandrels 52 for producing commercially identical round tubing of similar diameter and wall thickness. In such a case, the die apertures and mandrels are preferably circumferentially spaced 90° apart on a common radius from the geometric center of the die plate 36 and mandrel-supporting pedestal 48 to insure balanced die orifice pressures and static equilibrium of the die structure. With the exception of the 90° circumferential spacing, such an arrangement of the die orifices should be employed in all instances where similar extruded tubular sections are being produced in accordance with the teachings of this invention, regardless of the number (two or more) or cross section configuration of similar tubular sections being simultaneously produced in any one die structure. That is, the die apertures and registering mandrels, for commercially identical tubular sections or shapes, should be equally spaced circumferentially on a single radius circle having its center in coincidence with the female die plate and mandrel-supporting pedestal. The further features, which provide for directional flow of the material to be extruded forwardly between the cantilever arms supporting the mandrels, and radially outwardly into the marginal space between the interior liner of the billet cylinder and outer peripheral surfaces of the mandrels, should also be observed to insure axial forward and radial inward flow of the material under continued extrusion pressure to unite the several streams of the same within the space 58 under the mandrel-supporting cantilever arms 50 in front of the female die plate 36.

Figure 7:
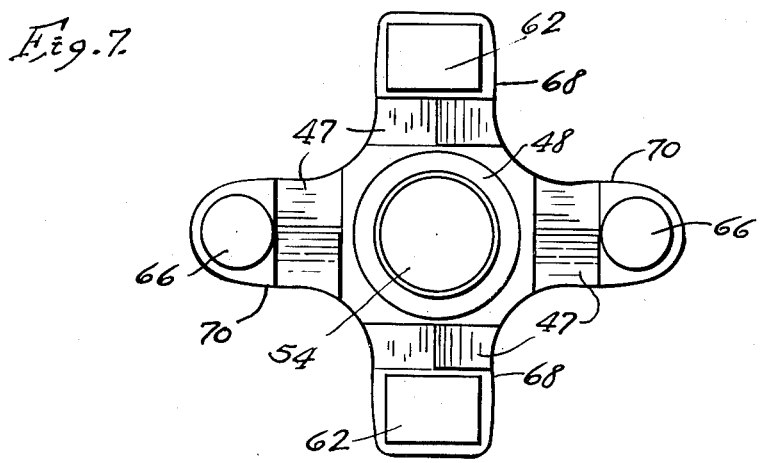
Fig. 7 represents a plan view of the underside of a mandrel-supporting member for assembly with the die plate of Fig. 6.

The die structure may be modified to adapt the same to the production of dissimilar tubular extruded sections or shapes in which case it can be employed for simultaneously producing four, or any greater equal number of sections. In this form of the invention, the dissimilar die orifices are disposed in pairs of similar extruded shapes at diametrically opposite points in respect to the geometric center of the female die plate and mandrel-supporting pedestal. An example of such a die structure would be one for simultaneously producing two tubular sections of commercially identical rectangular tubing and two commercially identically round tubing sections, such as illustrated in Figs. 6 and 7. The die structure in this example would have the two rectangular tubing die orifices formed between die apertures 60 and mandrels 62 diametrically oppositely disposed from each other and the two round tubing die orifices formed between die apertures 64 and mandrels 66 in opposite diametrically disposed relationship. The radial length of the cantilever mandrel-supporting arms 68 and 70 would be equal in respect to any one pair of diametrically oppositely disposed similar die orifices, and the radial length of the arms, in respect to dissimilar pairs, would vary in proportion to the resistance to flow of the metal in the dissimilar sections. By this arrangement, the forces acting on the die structure are brought into static balance. It will be understood that the die plate and mandrel arrangement of Figs. 6 and 7 are otherwise similar to the previously described tool arrangements illustrated in Figs. 1 through 5.

Regardless of the arrangement of cantilever-supported mandrels and cooperating female die apertures, it is a significant structural feature of the invention that the mandrel-supporting pedestal and unitarily connected cantilever arms provide a forwardly protruding nose piece that serves to pierce the material forced thereagainst during an extrusion operation to direct the extrudable material forwardly and outwardly to fill the surrounding space between the interior wall of the material confining cylinder and outer peripheral surfaces of the protruding mandrels, while permitting axial forward flow between the mandrel-supporting arms. Continued extrustion pressure causes coalescence and union of the axial streams of material with radial inward flow into the space between the underside of the mandrel-supporting member and the front face of the female die plate.

What is claimed is:

1. An extrusion die structure comprising a die plate having a plurality of die apertures formed therethrough in circumferential arrangement around the geometric center of the die plate, a pedestal unitarily attached in respect to said die plate centrally thereof, extending forwardly thereof and movable therewith into and out of sealing assembly with the discharge end of an extrusion cylinder with the pedestal in longitudinal axial alignment with the extrusion cylinder axis, radially extending cantilever arms attached to said pedestal, said cantilever arms each terminating in a rearwardly directed mandrel having its free unsupported terminal end projecting into a registering die aperture to form a die orifice therewith defining a hollow extrusion, and said radially extending cantilever arms terminating inwardly from the plane of the circumferential wall of the extrusion cylinder on sealed assembly of the unitary die structure with the extrusion cylinder.

2. An extrusion die structure comprising a die plate having an even number of die apertures formed therethrough in circumferential arrangement about the geometric center of the die plate in equal angular relationship with respect thereto, a pedestal unitarily attached in respect to said die plate centrally thereof, extending forwardly thereof and movable therewith into and out of sealing assembly with the discharge end of an extrusion cylinder with the pedestal in longitudinal axial alignment with the extrusion cylinder axis, radially extending cantilever arms attached to said pedestal, said cantilever arms each terminating in a rearwardly directed mandrel having its free unsupported terminal end projecting into a registering die aperture to form a die orifice therewith defining a hollow extrusion, and said radially extending cantilever arms terminating inwardly from the plane of the circumferential wall of the extrusion cylinder on sealed assembly of the unitary die structure with the extrusion cylinder.

3. An extrusion die structure of unitary construction comprising a die plate provided with die apertures extending therethrough circumferentially disposed in respect to the geometric center of the die plate, a pedestal removably attached to said die plate in registry with its geometric center, extending forwardly thereof and unitarily movable therewith into and out of sealing assembly in respect to the die plate and the discharge end of an extrusion cylinder with the pedestal in longitudinal axial alignment with the extrusion cylinder axis, radially outwardly extending cantilever arms secured to said central pedestal, each of said arms terminating in a rearwardly directed mandrel having its free unsupported end projecting into a registering die aperture to form a die orifice defining a hollow extrusion, said radially outwardly extending cantilever arms being of generally arcuate form and terminating radially inwardly from the plane of the circumferential wall of the extrusion cylinder on sealed assembly of the unitary die structure with the extrusion cylinder, and said central pedestal being of sufficient length to provide a material coalescing clearance space between the front face of the die plate and underside of the radially outwardly extending, mandrel-supporting arms in unobstructed communication with all of the die orifices.

4. A unitary extrusion die structure for simultaneously producing a plurality of tubular extrusions, said die structure comprising a die plate provided with a plurality of die apertures therethrough disposed circumferentially in identical pairs of the same at diametrically opposite locations in respect to the geometric center of the die plate, a mandrel-carrying pedestal centrally secured to the front face of the die plate and protruding forwardly thereof, said die plate and pedestal being movable as a unit into and out of sealing assembly of the die plate in respect to the discharge end of an extrusion cylinder, the axis of said pedestal and extrusion cylinder being in coincidence on sealed assembly in respect to the die plate and extrusion cylinder, a plurality of rigid cantilever arms equal in number to the die apertures radiating outwardly from the pedestal and attached thereto adjacent its end furthest removed from the front face of the die plate, said arms being convexly curved in the direction of the die plate and terminating in a plane forwardly of the front face thereof, a mandrel attached to the free end of each cantilever arm in registry with and projecting into a die aperture in the die plate to form a die orifice therewith, and said cantilever arms terminating radially inwardly from the plane of the circumferential wall of the extrusion cylinder on sealed assembly of the unitary die structure with the extrusion cylinder.

References Cited in the file of this patent

UNITED STATES PATENTS

| 374,167 | Appleby | Dec. 6, 1887 |
| 1,847,365 | Skinner | Mar. 1, 1932 |
| 2,172,867 | Dreyer | Sept. 12, 1939 |

FOREIGN PATENTS

| 7,427 | Great Britain | 1837 |
| 504,605 | Great Britain | Apr. 27, 1939 |